UNITED STATES PATENT OFFICE 2,209,463

WAX COMPOSITION

Eugene Lieber, Linden, and Louis A. Mikeska, Westfield, N. J., assignors to Standard Oil Development Company, a corporation of Delaware No Drawing. Application December 4, 1937, Serial No. 178,066

4 Claims. (Cl. 23—250)

This invention relates to the production of improved wax compositions. It is concerned with the production of stable petroleum wax compositions which do not deteriorate upon exposure to air or at elevated temperatures. The invention especially relates to the production of stable refined petroleum wax compositions which are suitable for protective surfaces in metal or paper containers as, for example, in those containers employed in the distribution of foods and liquid products. These improved wax compositions are secured by incorporating in waxes stabilizing compounds of the class of the following formula:

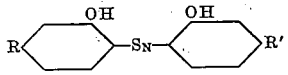

in which R represents an alkyl group, preferably having from 2 to 8 carbon atoms, R' preferably represents a group the same as R but may represent hydrogen or a different alkyl radical, and N is an integer from 1 to 4.

The above formula is merely diagrammatic and the substituent groups are not limited to the positons or the aromatic nuclei shown therein. They may be at any position on the aromatic ring and the ring may contain more than one alkyl or hydroxy group. These alkyl groups may also contain other substituent groups and the simple aromatic nuclei may be replaced with naphthyl, anthracyl or other condensed aromatic radicals. The preferred materials of this class are the dialkyl diphenol thio-ethers in which the alkyl groups contain from 4 to 6 carbon atoms. Dialkyl diphenol disulfides are also preferred materials, especially those containing alkyl groups of from 4 to 6 carbon atoms. Polymers of these materials are also satisfactory as, for example, materials of the structure:

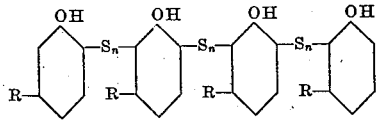

in which R and n represent groups enumerated above.

Specific stabilizing materials in accordance with the above formula are dipropyl dihydroxy diphenyl sulfide, dibutyl dihydroxy diphenyl sulfide, ditertiary amyl dihydroxy diphenyl sulfide, diheptyl dihydroxy diphenyl sulfide, dibutyl dihydroxy diphenyl disulfide, dibutyl dihyroxy diphenyl trisulfide, dihexyl dihydroxy diphenyl tetra sulfide and diethyl dihydroxy diphenyl tetra sulfide. The preferred products are the ditertiary amyl dihydroxy diphenyl sulfides, preferably the mono and disulfide. The preferred polymer is a tetramer containing 4 phenol radicals.

These stabilizing compounds may be prepared or secured by any of the known processes. For example, in the preparation of dialkyl dihydroxy diphenyl thio-ether, the corresponding alkyl phenol may be heated with sulphur dichloride which results in the evolution of hydrogen chloride. Dialkyl dihydroxy diphenyl thio-ethers may also be prepared by reacting phenol with sulphur dichloride as, for example, to form dihydroxy diphenyl thio-ether. These materials may then be alkylated by reacting with the particular olefin desired in the presence of a condensing agent as, for example, sulphuric acid, boron fluoride or aluminum chloride. The dihydroxy diphenyl thio-ethers may also be reacted with an alcohol or alkyl chloride in the presence of a condensing agent. Another method of preparing dialkyl dihydroxy diphenyl thio-ethers is to react phenol with sulphur chloride forming dihydroxy diphenyl thio-ether and then to react this material with alkyl chlorides or dialkyl sulfates in alkaline media. A desirable source for the alkyl phenols utilized in the above-described connections is the alkylated phenol secured when condensing phenol with the butene or pentene fraction secured in the cracking of petroleum.

A process for preparing, for example, alkyl phenol poly sulfides is to react the corresponding alkyl phenol with sulphur dichloride, preferably in the presence of an inert solvent as, for example, chlorinated hydrocarbons. A preferred solvent is ethylene chloride which boils at a temperature well suited for this condensation. Hydrogen halide is allowed to escape from the reaction zone during the reaction. The products of the reaction are separated by distillation. In this reaction, the mol ratio of alkyl phenol to sulphur chloride is preferably in the range of 1 mol of alkyl phenol to 0.4 and 0.6 mols of sulphur mono chloride. The alkyl hydroxy phenyl poly sulfides may be secured with a mixture of sulphur mono chloride and sulphur dichloride, in which the proportion of the sulphur dichloride is less than 0.75, preferably about 0.10 to 0.35, based upon the possible sulphur chloride used. This reaction will give a product of alkyl phenol disulfide and alkyl phenol mono sulfide.

Alkyl phenol sulfide polymers may be obtained by reacting the corresponding alkyl phenol with sulphur dichloride in a mol ratio of sulphur dichloride to phenol between 1 and 1.5, preferably in the presence of an inert solvent as, for example, ethylene chloride or chlorobenzol, at a temperature of from 140 to 275° F. In this reaction, both the alkyl phenol sulfides and the polymers are formed. The alkyl phenol sulfides, if desired may be separated from their polymers by distillation under vacuum. A preferred method for securing polymers is to react a dialkyl dihydroxy diphenyl sulfide with sulphur dichloride in a ratio of 2 mols of the dialkyl dihydroxy diphenyl sulfide per mol of sulphur dichloride. The stabilizing materials prepared according to the above processes may be further purified by distillation, extraction treating or similar methods.

These stable wax compositions may be prepared by incorporating the stabilizing inhibitors in a petroleum wax which has been prepared by any of the well-known methods, as for example, by plate and frame pressing, cold settling, centrifuging or by solvent extraction methods. Stable wax compositions may be prepared by incorporating the stabilizing inhibitors in crude wax but the preferred wax compositions are secured by incorporating the stabilizing materials in a wax which has been refined for commercial use, having desirable physical properties as, for example, having a white cast and containing less than 0.5% of expressible oil and moisture. The preferred stable wax compositions are secured by using waxes having melting points in the range from 110° F. to 170° F., preferably about 120° to 150° F.

These stabilizing materials may be incorporated with the wax in any desired amount, depending upon the conditions under which the material is to be used. If the conditions are harsh or severe, it is desirable to add a relatively large amount, while if the conditions are relatively mild, a very minute quantity will be sufficient. The stabilizing material may be contained in the wax in a concentration of from 0.001% to 2% or higher. It is, however, preferred to add the material in concentrations from 0.001% to 0.1%.

The following examples are given for purpose of illustration and are not to be construed as limiting the invention in any manner whatsoever.

EXAMPLE 1

A petroleum wax was separated from the petroleum fraction by pressing and was then purified by sweating, acid treating and clay filtration. The purified wax had the following specifications:

Melting point (A. S. T. M.) _____ 130 to 132° F.
Expressible oil and moisture _____ Less than 0.5%
Cast _____ White This wax was tested for deterioration along with other wax compositions prepared in accordance with the present invention. The respective wax compositions were stored at a temperature of 200° F. and the deterioration measured by the acid test*. The results were as follows:

*The acid test is determined by dissolving a sample of the wax in naphtha and alcohol and the resulting solution is then titrated with alcohol potassium hydroxide.

*Acidities developed on wax storage at 200° F.*

| Inhibitor | Acidities developed on wax storage at 200° F., days | | | | Color of final product |
|---|---|---|---|---|---|
| | 0 | 15 | 30 | 60 | |
| None | .013 | 14.0 | 64.0 | 57.0 | Brown. |
| .02% of ditertiary amyl dihydroxy diphenyl sulfide | | .045 | .06 | .06 | White. |
| .02% of ditertiary amyl dihydroxy diphenyl disulfide | | .052 | .052 | .09 | Do. |

The above data shows that the highly refined wax not containing an inhibitor was subject to rapid deterioration, resulting in a brown colored product at the end of sixty days, which would be obviously unsuitable for commercial use, especially for use in regard to food or similar products. The decreased acidity indicated at the end of sixty days over the acidity indicated at the end of thirty days was probably due to esterification. The data also shows the marked stability of the wax compositions prepared by the present process.

EXAMPLE 2

Various known commercial inhibitors were added in the concentration indicated to the above described petroleum wax with the following results:

| Inhibitor | Concentration | Acidities developed on storage at 200° F., days | | | | Color of final product |
|---|---|---|---|---|---|---|
| | | 0 | 15 | 30 | 60 | |
| | Percent | | | | | |
| Triphenyl tin chloride | 0.2 | .03 | .035 | .047 | 6.8 | Milky. |
| m-Toluene diamine | 0.2 | .02 | .04 | 0.1 | 46.0 | Sediment-amber. |
| Diphenylamine | 0.2 | .018 | 0.1 | 0.6 | 60 | Brown. |
| Hydroquinone | 0.02 | | .17 | 11.0 | 60 | |
| Beta-naphthol | 0.02 | | .022 | 2 | 60 | |

This data, together with the data presented in Example 1, clearly demonstrates the superiority of the wax composition secured by the process of the present invention.

The invention is not to be limited by any theory or method of operation but only by the following claims in which it is desired to claim all novelty in so far as the prior art permits.

We claim:

1. Improved normally solid petroleum wax composition comprising a light colored petroleum wax and as a color stabilizing agent a minor quantity of a substance of the class of alkyl hydroxy phenyl sulfides in which the sulfur is directly connected to a carbon atom of the phenyl ring.

2. Improved normally solid petroleum wax composition comprising a major proportion of a refined petroleum wax and from 0.002% to 2% of a substance of the class of dialkyl dihydroxy diphenyl sulfides in which the sulfur is directly connected to a carbon atom of the phenyl ring.

3. Composition in accordance with claim 2 in which said sulfide is ditertiary amyl dihydroxy diphenyl disulfide.

4. Improved normally solid petroleum wax composition comprising a major proportion of a refined petroleum wax and from 0.002% to 2% of a polymer derived from substances of the class of dialkyl dihydroxy diphenyl sulfides in which the sulfur is directly connected to a carbon atom of the phenyl ring.

EUGENE LIEBER.
LOUIS A. MIKESKA.